(12) United States Patent
Wolf et al.

(10) Patent No.: US 9,141,875 B2
(45) Date of Patent: Sep. 22, 2015

(54) METHOD AND SYSTEM FOR CORRECTING GAZE OFFSET

(75) Inventors: Lior Wolf, Herzlia (IL); Ziv Freund, Tel-Aviv (IL)

(73) Assignee: Ramot at Tel-Aviv University Ltd., Tel-Aviv (IL)

(*) Notice: Subject to any disclaimer, the term of this patent is extended or adjusted under 35 U.S.C. 154(b) by 136 days.

(21) Appl. No.: 13/699,751

(22) PCT Filed: Apr. 26, 2011

(86) PCT No.: PCT/IL2011/000334
§ 371 (c)(1),
(2), (4) Date: Nov. 26, 2012

(87) PCT Pub. No.: WO2011/148366
PCT Pub. Date: Dec. 1, 2011

(65) Prior Publication Data
US 2013/0070046 A1  Mar. 21, 2013

Related U.S. Application Data

(60) Provisional application No. 61/348,269, filed on May 26, 2010.

(51) Int. Cl.
H04N 7/14 (2006.01)
G06K 9/60 (2006.01)
G06K 9/00 (2006.01)
G06T 5/00 (2006.01)

(52) U.S. Cl.
CPC ............. *G06K 9/60* (2013.01); *G06K 9/0061* (2013.01); *G06T 5/005* (2013.01); *H04N 7/144* (2013.01); *G06T 2207/10016* (2013.01); *G06T 2207/30201* (2013.01)

(58) Field of Classification Search
USPC .............. 348/14.16, 14.01, 14.12, 14.14; 382/103, 275; 345/8, 156
See application file for complete search history.

(56) References Cited

U.S. PATENT DOCUMENTS

| 5,499,303 A | 3/1996 | Hundt et al. |
| 5,831,594 A * | 11/1998 | Tognazzini et al. ........... 345/156 |
| 6,134,344 A | 10/2000 | Burges |
| 6,433,759 B1 | 8/2002 | Richardson et al. |
| 6,677,980 B1 | 1/2004 | Jeon |

(Continued)

FOREIGN PATENT DOCUMENTS

| WO | WO 2011/030263 | 3/2011 |
| WO | WO 2011/148366 | 12/2011 |

OTHER PUBLICATIONS

International Preliminary Report on Patentability Dated Dec. 6, 2012 From the International Bureau of WIPO Re. Application No. PCT/IL2011/000334.

(Continued)

*Primary Examiner* — Olisa Anwah

(57) ABSTRACT

A method of correcting gaze offset in an image of at least one individual having eyes is disclosed. The method comprises: processing the image to extract location of at least one eye over the image, processing the image to replace imagery data associated with each location of each eye with replacement data thereby providing a corrected image, and transmitting the corrected image to a display device. The replacement data are preferably previously-recorded imagery data which respectively correspond to the same eye but a different gaze.

26 Claims, 11 Drawing Sheets

(56) References Cited

U.S. PATENT DOCUMENTS

| | | | |
|---|---|---|---|
| 6,711,293 | B1 | 3/2004 | Lowe |
| 6,771,303 | B2 | 8/2004 | Zhang et al. |
| 6,806,898 | B1 | 10/2004 | Toyama et al. |
| 6,892,193 | B2 | 5/2005 | Bolle et al. |
| 7,292,735 | B2 * | 11/2007 | Blake et al. .................... 382/275 |
| 7,542,210 | B2 * | 6/2009 | Chirieleison, Sr. ............ 359/630 |
| 7,809,160 | B2 * | 10/2010 | Vertegaal et al. ............. 382/103 |
| 7,810,926 | B2 * | 10/2010 | Connell, II .................... 351/210 |
| 8,044,808 | B2 * | 10/2011 | Koshizen et al. ............. 340/576 |
| 8,235,529 | B1 * | 8/2012 | Raffle et al. ................... 351/209 |
| 8,356,004 | B2 * | 1/2013 | Jung et al. ....................... 706/62 |
| 8,487,838 | B2 * | 7/2013 | Lewis et al. ........................ 345/8 |
| 8,506,080 | B2 * | 8/2013 | Raffle et al. ................... 351/209 |
| 8,657,442 | B2 * | 2/2014 | Bonnin et al. ................ 351/210 |
| 8,692,739 | B2 * | 4/2014 | Mathieu et al. .................... 345/7 |
| 8,752,963 | B2 * | 6/2014 | McCulloch et al. .......... 351/209 |
| 8,957,943 | B2 * | 2/2015 | Nourbakhsh ............. 348/14.16 |
| 2008/0187213 | A1 | 8/2008 | Zhang et al. |
| 2008/0278516 | A1 * | 11/2008 | Santon .......................... 345/619 |
| 2009/0079816 | A1 * | 3/2009 | Qvarfordt et al. .......... 348/14.16 |

OTHER PUBLICATIONS

International Search Report and the Written Opinion Dated Sep. 9, 2011 From the International Searching Authority Re. Application No. PCT/IL2011/000334.

Basri et al. "Lambertian Reflectance and Linear Subspaces", IEEE Transactions on Pattern Analysis and Machine Intelligence, 25(2): 218-233, Feb. 2003.

Bitouk et al. "Face Swapping: Automatically Replacing Faces in Photographs", ACM Transactions on Graphics, 27(3): Art.39:1-39:8, Aug. 2008.

Criminisi et al. "Gaze Manipulation for One-to-One Teleconferencing", Proceedings of the 9th IEEE International Conference on Computer Vision, 2: 1-8, 2003.

Everingham et al. "'Hello! My Name Is . . . Buffy'—Automatic Naming of Characters in TV Video", Proceedings of the 17th British Machine Vision Conference (BMVC'2006), p. 889-908, Sep. 2006.

Felzenszwalb et al. "Pictorial Structures for Object Recognition", International Journal of Computer Vision, 61(1): 55-79, 2005.

Gemmell et al. "Gaze Awareness for Video-Conferencing: A Software Approach", IEEE MultiMedia, p. 26-35, Oct.-Dec. 2000.

Liu et al. "Expressive Expression Mapping With Ratio Images", Proceedings of the 28th Annual Conference on Computer Graphics and Interactive Techniques, p. 271-276, 2001.

Riklin-Raviv et al. "The Quotient Image: Class Based Recognition and Synthesis Under Varying Illumination Conditions", Vision and Pattern Recognition, 1-6, 1999.

Tian et al. "Dual-State Parametric Eye Tracking", International Conference on Automatic Face and Gesture Recognition, Grenoble, France, Mar. 28-30, 2000, p. 110-115, Mar. 2000.

Viola et al. "Robust Real-Time Detection", International Journal of Computer Vision, 57(2): 137-154, 2004.

Wang et al. "Face Relighting From a Single Image Under Arbitrary Unknown Lighting Conditions", IEEE Transactions on Pattern Analysis and Machine Intelligence, 31(11): 1968-1984, Nov. 2009.

Yuille et al. "Feature Extraction From Faces Using Deformable Templates", International Journal of Computer Vision, 8(2): 99-111, 1992.

\* cited by examiner

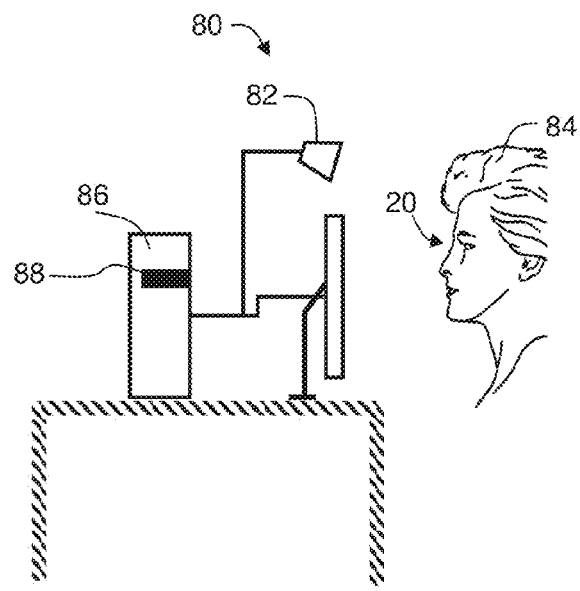
FIG. 8
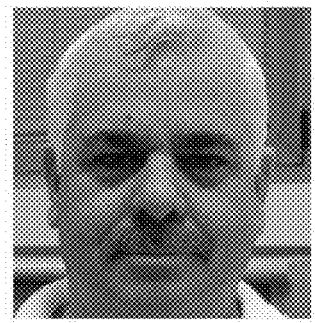 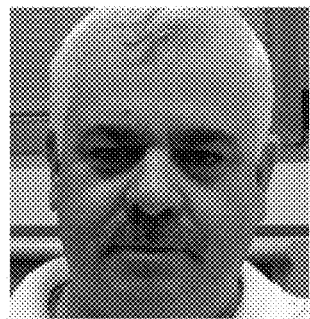
FIG. 9A          FIG. 9B
 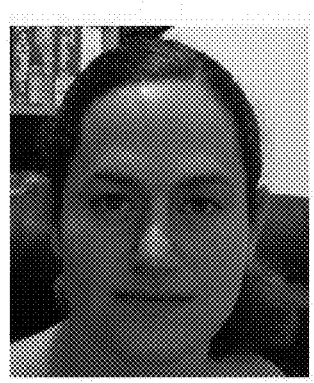
FIG. 9C          FIG. 9D FIG. 12A
FIG. 12B
FIG. 12C
FIG. 12D
FIG. 13A
FIG. 13B
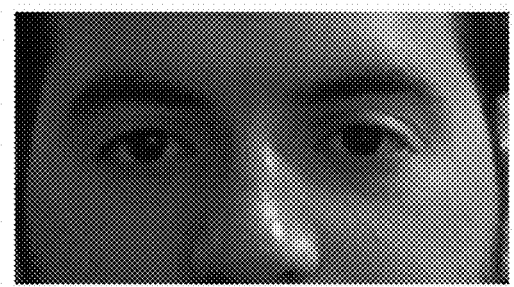
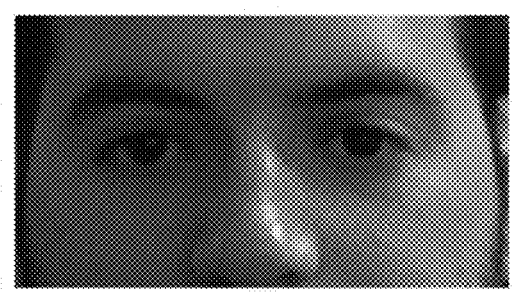
FIG. 13C
FIG. 13D

METHOD AND SYSTEM FOR CORRECTING GAZE OFFSET

RELATED APPLICATION APPLICATIONS

This application is a National Phase of PCT Patent Application No. PCT/IL2011/000334 having International filing date of Apr. 26, 2011, which claims the benefit of priority under 35 USC §119(e) of U.S. Provisional Patent Application No. 61/348,269, filed on May 26, 2010[H]. The contents of the above applications are all incorporated by reference as if fully set forth herein in their entirety.

FIELD AND BACKGROUND OF THE INVENTION

The present invention, in some embodiments thereof, relates to image processing and, more particularly, but not exclusively, to a method and system for processing an image to correct gaze offset.

Videoconferencing systems hold the promise of allowing a natural interpersonal communication at a range. Recent advances in video quality and the adaptation of large high definition screens are contributing to a more impressive user experience.

Along with gestures and facial expression, gaze is one of the most important aspects of person's non-verbal behavior, and many socio-psychological studies have been attested to the importance of the gaze direction and visual contact as communicative signals. In the case of conventional videoconference systems, the arrangement of camera, monitor and user causes an angular error between the gaze direction towards the monitor and the camera optical axis. As a result, when the remote party is looking straight into the image of the local party, the gazes, as perceived by the two parties, are not collinear. For example, when camera is located on top of the screen, the effect is interpreted as looking down.

Several solutions have been proposed to the problem of offset gaze in videoconferencing. One such solution employs a beam splitter between camera and monitor. A partially transparent mirror is fitted in front of the monitor in such a way that the viewer can see the monitor image through the mirror. By means of this mirror, the camera captures the viewer from the direction of the monitor, permitting recording and reproduction over one axis.

Some techniques reproduce the image of the other party by a video projector on a projection screen. The camera can be located behind the projection screen and the party's image can be captured through the screen by means of a window provided with a light valve or a partially transparent projection screen.

Another technique employs view synthesis from multiple cameras. In one such technique, dynamic programming based disparity estimation is used to generate a middle view from two cameras that were positioned on the left and right sides of the screen [A. Criminisi, J. Shotton, A. Blake, and P. H. S. Torr. Gaze manipulation for one-to-one teleconferencing. In ICCV, 2003].

In an additional technique, the images of participants are rendered digitally in a virtual three-dimensional space, and a head-pose orientation and eye-gaze direction are digitally corrected as internal mathematical computations without the need for a display device. The digitally corrected data are transmitted to a display screen so that a particular participant's image in the three-dimensional space appears to other participants viewing the screen as if the particular participant was looking at them screen [see, e.g., Gemmell et al., "Gaze awareness for video-conferencing: A software approach," IEEE MultiMedia, 2000, and U.S. Pat. No. 6,806,898].

In another technique, a gaze deviation value is determined and used for calculating a corresponding point of an input image corresponding to a particular position in a corrected image. A pixel value at the corresponding point is calculated using the input image from the camera. The gaze corrected image is transmitted by using the calculated pixel value as the pixel value of the particular position of the corrected image [U.S. Pat. No. 6,677,980].

Also known is a region filling technique in which the pupils of the other party in the image plane are segmented and displaced in the image plane, wherein areas which become free as a result of this displacement are filled-in using the color of the eyeballs [U.S. Pat. No. 5,499,303].

Additional background art includes U.S. Pat. Nos. 6,433,759 and 6,771,303.

SUMMARY OF THE INVENTION

According to an aspect of some embodiments of the present invention there is provided a method of correcting gaze offset in an image of at least one individual having eyes. The method comprises: processing the image to extract location of at least one eye over the image, processing the image to replace imagery data associated with each location of each eye with replacement data thereby providing a corrected image, and transmitting the corrected image to a display device. The replacement data is preferably previously-recorded imagery data which respectively correspond to the same eye but a different gaze.

According to some embodiments of the invention the method comprises, prior to the extraction of the locations, capturing at least one image of each of the at least one individual at one or more predetermined gazes, thereby providing the previously-recorded data.

According to some embodiments of the invention the method comprises processing the previously-recorded data so as to compute eye parameters wherein the replacing is based on the computed parameters.

According to some embodiments of the invention the computation of the parameters is bootstrapped using a non-specific database of eye images.

According to some embodiments of the invention the method comprises applying a morphological transformation to the previously-recorded data according to the parameters.

According to some embodiments of the invention the invention the method comprises varying the parameters so as to optimize a predetermined objective function describing matching between the replacement data and images in the non-specific database.

According to some embodiments of the invention the method comprises varying the parameters so as to optimize a predetermined objective function describing matching between the replacement data and the imagery data associated with the location of the eye.

According to some embodiments of the invention the method comprises, for each eye, determining whether an eyelid of the eye is close or open, wherein the imagery data is replaced with the replacement data only if the eyelid is open.

According to some embodiments of the invention the method comprises, for each eye, determining a characteristic gaze direction of the eye, wherein the imagery data is replaced with the replacement data only if the gaze direction is other than a predetermined gaze direction.

According to some embodiments of the invention the method comprises, processing the image to replace imagery data associated with each location of each eye with additional replacement data to provide at least one additional corrected image such that each corrected image is characterized by a different gaze, and transmitting each corrected image to a different display device.

According to some embodiments of the invention the method comprises for each eye, determining a characteristic gaze direction of the eye, wherein the at least one additional corrected image is generated responsively to the determined characteristic gaze direction.

According to an aspect of some embodiments of the present invention there is provided a computer software product, comprising a computer-readable medium in which program instructions are stored. The instructions, when read by a processor, cause the processer to process the image so as to extract locations of at least one eye over the image, to provide a corrected image by replacing imagery data associated with each location of each eye with replacement data and to transmit the corrected image to a display device. The replacement data are preferably previously-recorded imagery data respectively corresponding to the same eye but a different gaze.

According to an aspect of some embodiments of the present invention there is provided an imaging system. The imaging system comprises: (a) a camera for capturing an image of at least one individual having eyes; and (b) a processer configured for: processing the image so as to extract locations of at least one eye over the image, processing the image to replace imagery data associated with each location of each eye with replacement data, thereby providing a corrected image, and transmitting the corrected image to a display device. The replacement data are preferably being previously-recorded imagery data respectively corresponding to the same eye but a different gaze According to some embodiments of the invention the previously-recorded imagery data are processed by the processor so as to compute eye parameters wherein the imagery data are replaced based on the computed parameters.

According to some embodiments of the invention the computation of the parameters is bootstrapped using an annotated non-specific database of eye images.

According to some embodiments of the invention the previously-recorded data are transformed by the processor using a morphological transformation according to the parameters.

According to some embodiments of the invention the parameters are varied by the processor so as to optimize a predetermined objective function describing matching between the replaced data and the replacement data.

According to some embodiments of the invention the image is processed by the processor to determine whether an eyelid of the eye is close or open, and wherein the imagery data is replaced with the replacement data only if the eyelid is open.

According to some embodiments of the invention the image is processed by the processor to determine a characteristic gaze direction of the eye wherein the imagery data is replaced with the replacement data only if the characteristic gaze direction is other than a predetermined gaze direction.

According to some embodiments of the invention the image is processed by the processor to replace imagery data associated with each location of each eye with additional replacement data to provide at least one additional corrected image, such that each corrected image is characterized by a different gaze, and transmitting each corrected image to a different display device.

According to some embodiments of the invention the image is processed by the processor to determine a characteristic gaze direction of the eye, wherein the at least one additional corrected image is generated responsively to the determined characteristic gaze direction.

According to some embodiments of the invention the extraction of the locations comprises, for each eye: detecting eye corners, defining a region-of-interest based on the corners and scaling the region-of-interest to predetermined dimension.

According to some embodiments of the invention the previously-recorded imagery data is stored in a computer-accessible specific database of imagery data, and wherein the replacement of the imagery data comprises searching over the specific database for the previously-recorded imagery data.

According to some embodiments of the invention the search comprises comparing imagery data of the image with imagery data entries in the specific database, determining a similarity level responsively to the comparison, and selecting the previously-recorded imagery data based on the similarity level.

According to some embodiments of the invention the image is a frame of a video stream.

According to some embodiments of the invention the replacement data are selected from a specific database according to an optimization procedure which comprises a first objective function for reducing differences between the replacement data and replacement data of a previous frame, and a second objective function for reducing differences between the replacement data and replacement data of a frame immediately following an eyelid opening of the respective eye.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart diagram of a method suitable for correcting gaze offset in an image of one or more individuals, according to various exemplary embodiments of the present invention;

Figure 2A:
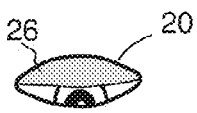
Figure 2B:
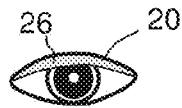
Figure 2C:
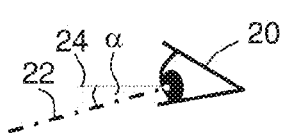
Figure 2D:
Figure 2E:
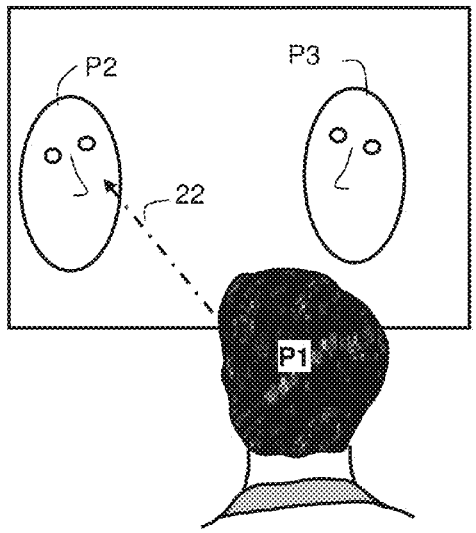
Figure 2F:
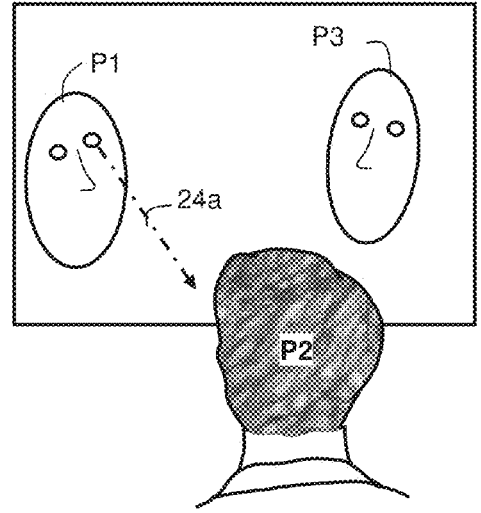
Figure 2G:
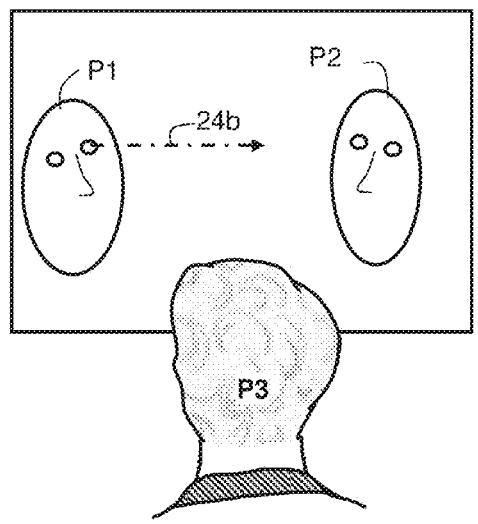
Figure 3:
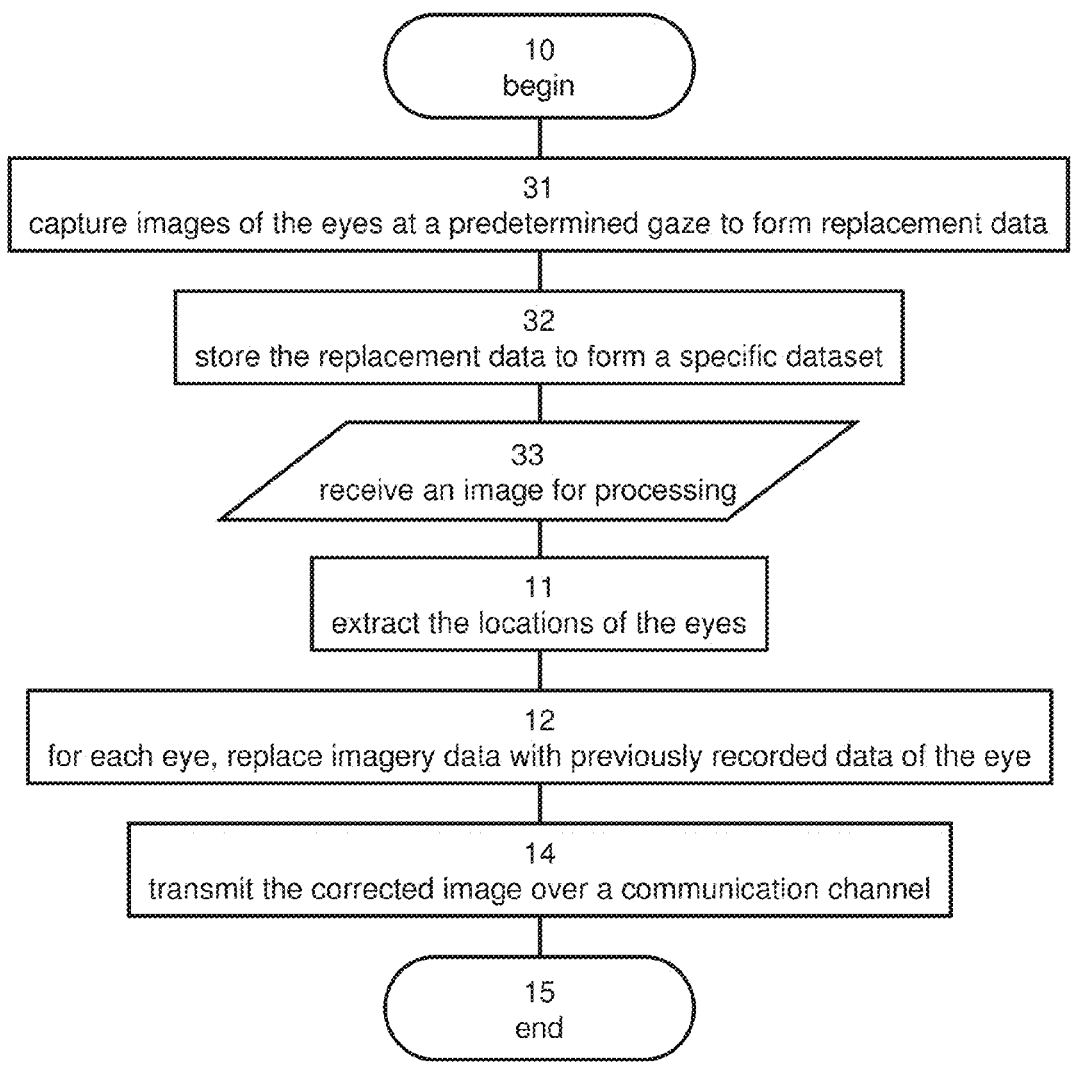
Figure 4:
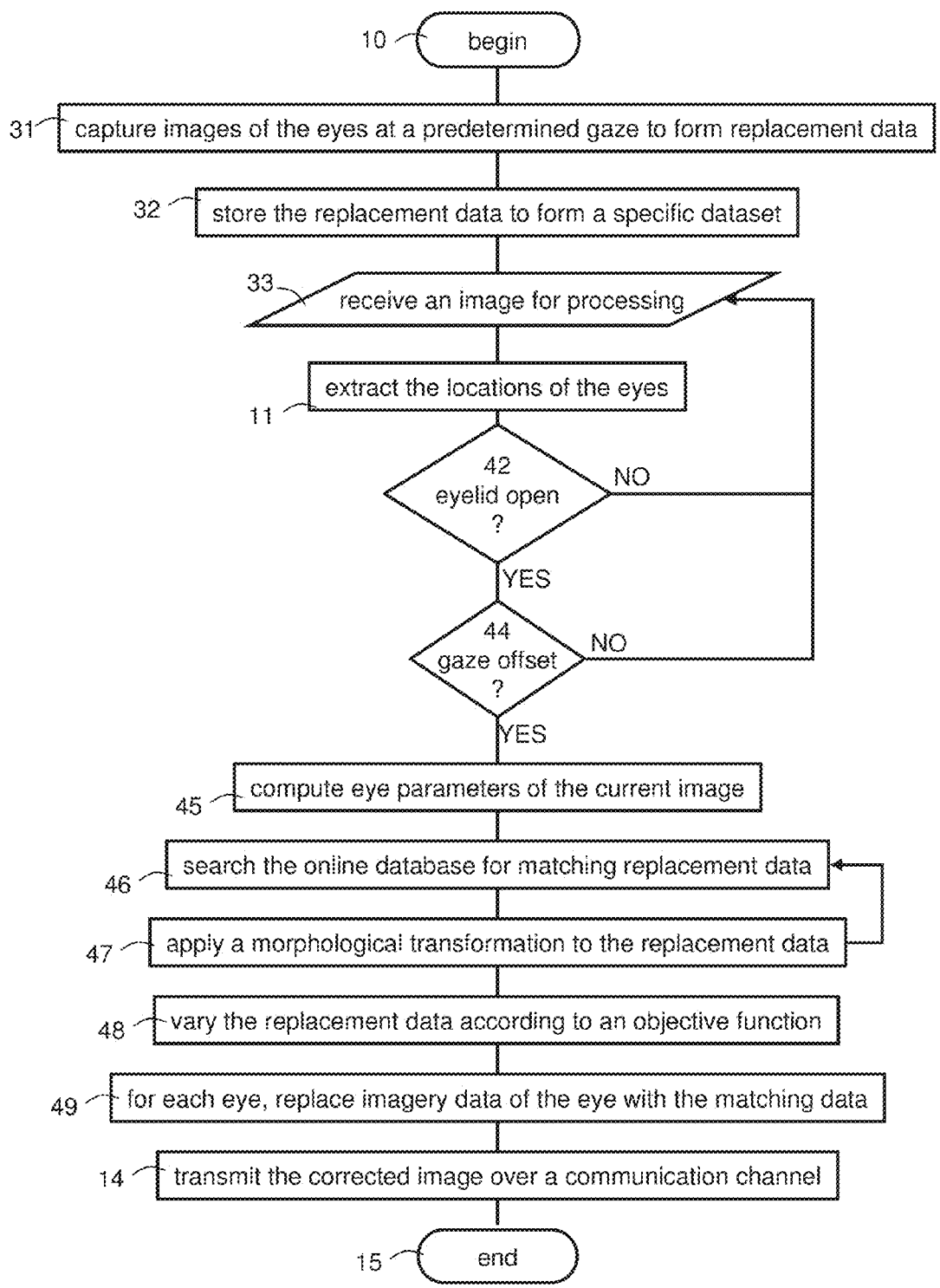
Figure 5:
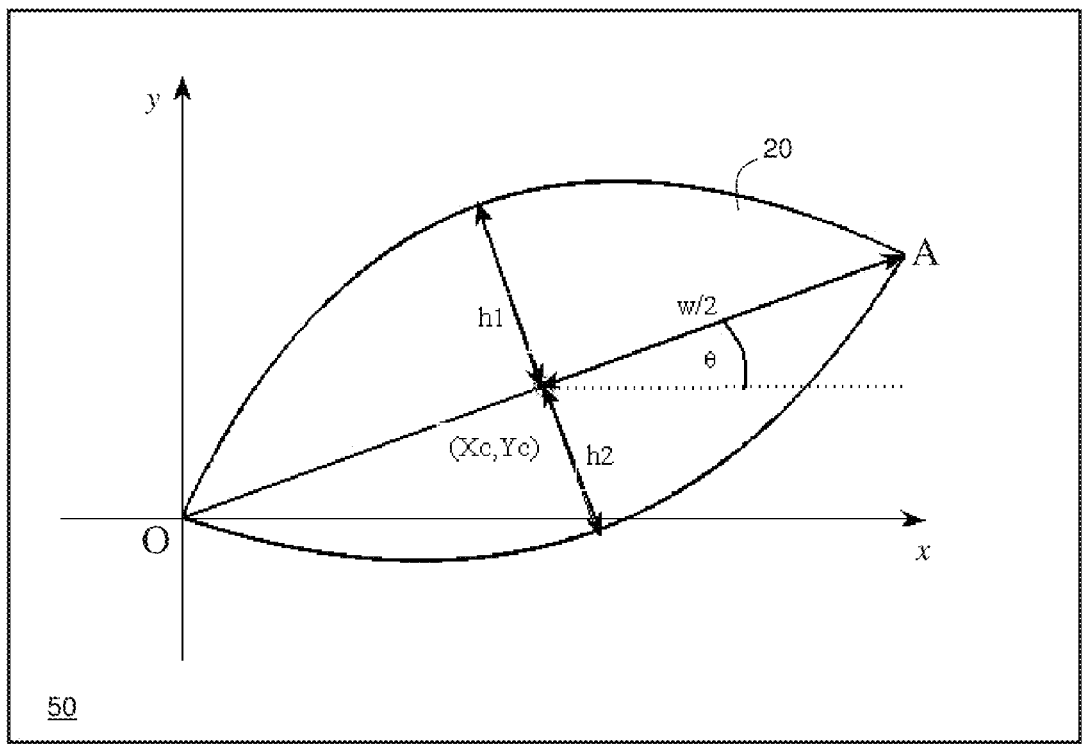
Figure 6:
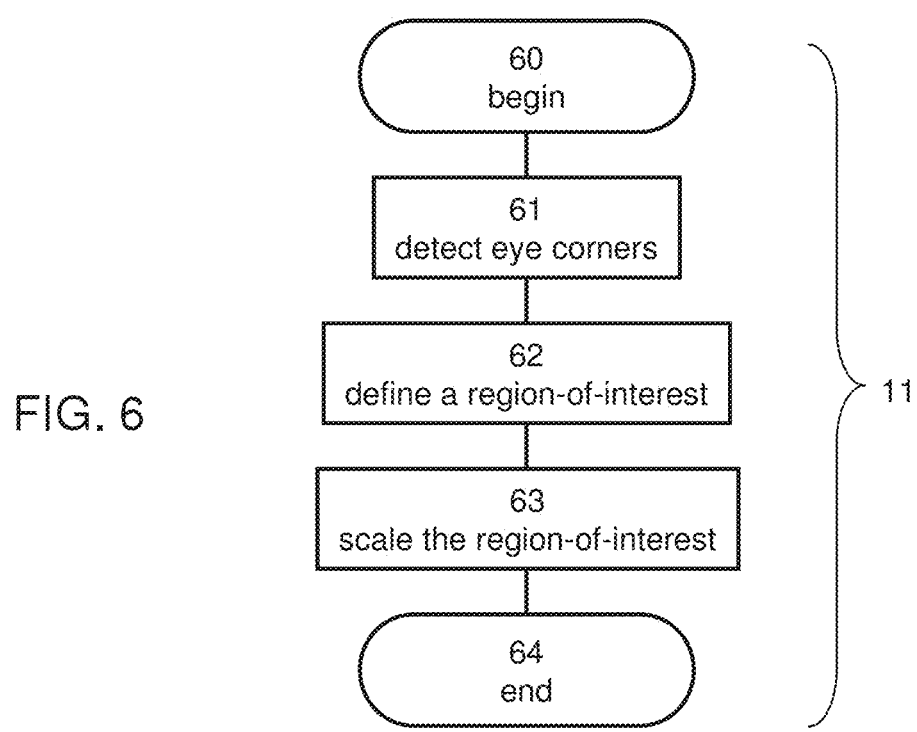
Figure 7:
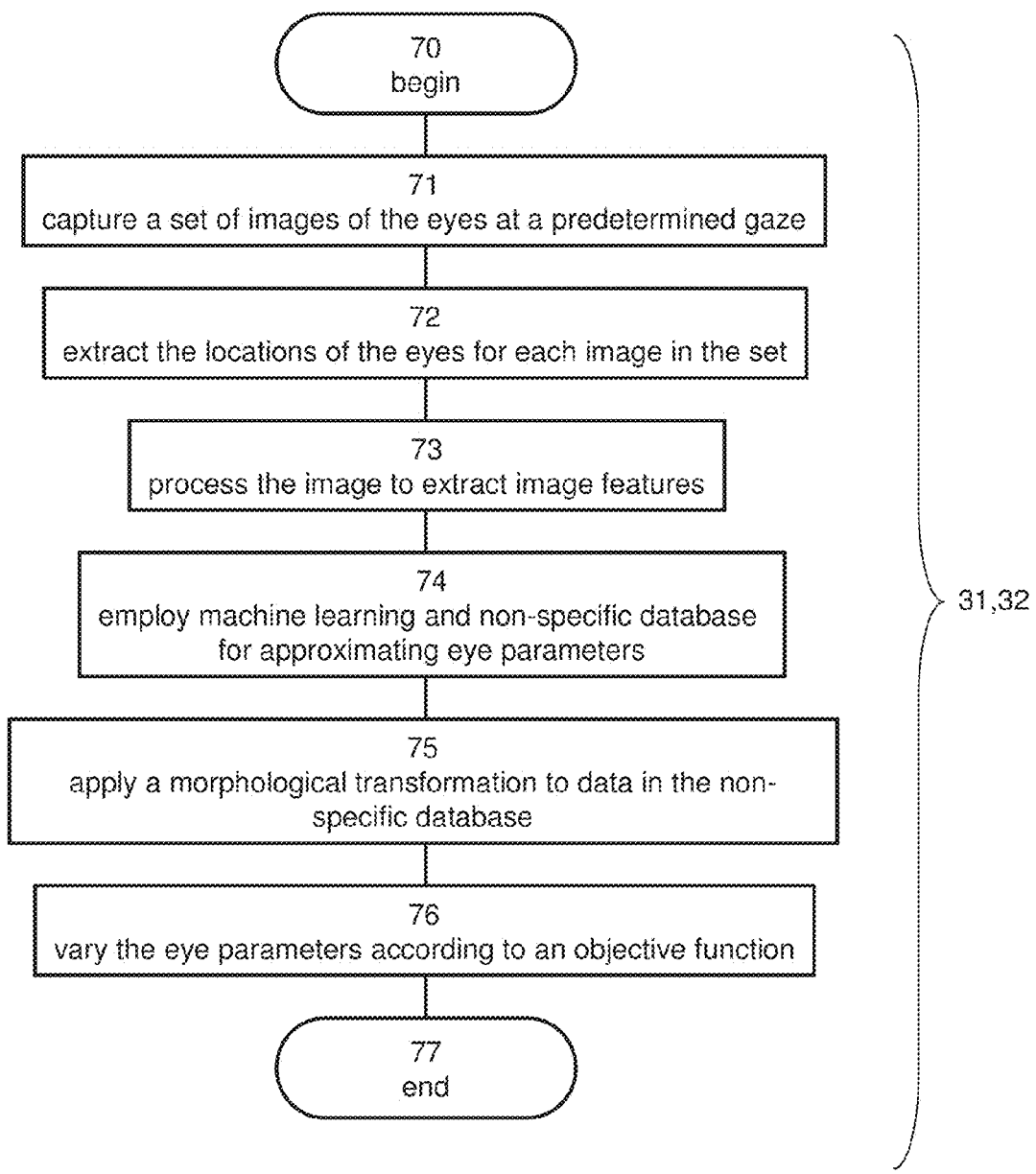
Figure 14:

FIGS. 2A-D are schematic illustrations of imagery data representing an offset gaze (FIGS. 2A and 2C) and replacement imagery data representing a corrected gaze (FIGS. 2B and 2D), according to various exemplary embodiments of the present invention;

FIGS. 2E-G are schematic illustrations of embodiments of the invention in which gaze correction is used for multilateral conferencing;

FIG. 3 is a flowchart diagram of a method suitable for correcting gaze offset in an optional embodiment of the invention in which the method also captures the replacement data;

FIG. 4 is a flowchart diagram of a method suitable for correcting gaze offset in embodiments of the invention in which the method comprises one or more additional optional operations;

FIG. 5 is a schematic illustration of a representative eye model, according to some embodiments of the present invention;

FIG. 6 is a flowchart diagram illustrating a procedure suitable for extracting the locations of an eye an image, according to some embodiments of the present invention;

FIG. 7 is a flowchart diagram illustrating a procedure suitable for constructing an annotated specific database, according to some embodiments of the present invention;

FIG. 8 is a schematic illustration of an imaging system 80, according to various exemplary embodiments of the present invention;

FIGS. 9A-D shows four images of two individuals captured during experiments performed according to some embodiments of the present invention;

FIGS. 10A-D show samples of successful (FIGS. 10A-C) and unsuccessful (FIG. 10D) facial feature points detection obtained by eye corner localization, according to some embodiments of the present invention;

FIGS. 11A-F show initially fitted model (red) and refined model obtained by a search procedure (green) as obtained in experiments performed according to some embodiments of the present invention;

FIGS. 12A-D show the effect of combined optimization procedure, according to various exemplary embodiments of the present invention;

FIGS. 13A-D demonstrates an eye replacement procedure employed in experiments performed according to some embodiments of the present invention; and FIG. 14 shows several frames from some of the video sequences processed in experiments performed according to some embodiments of the present invention.

DESCRIPTION OF SPECIFIC EMBODIMENTS
OF THE INVENTION

The present invention, in some embodiments thereof, relates to image processing and, more particularly, but not exclusively, to a method and system for processing an image to correct gaze offset.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
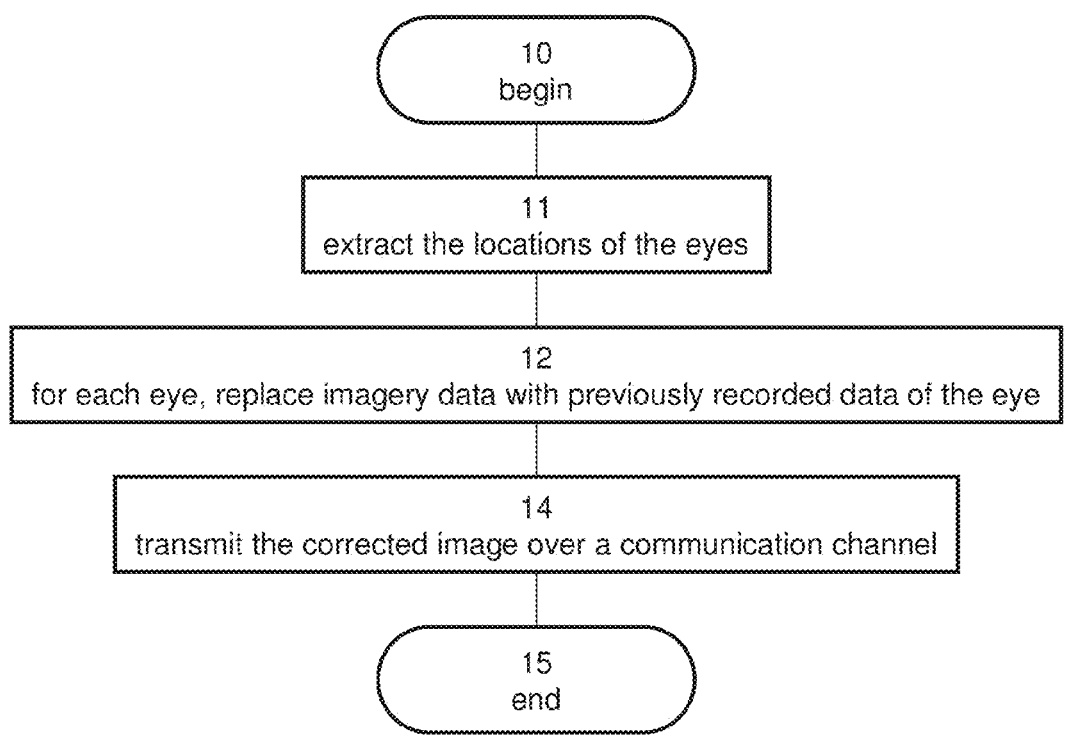

FIGS. 1, 3 and 4 are flowchart diagrams of a method suitable for correcting gaze offset in an image of one or more individuals, according to various exemplary embodiments of the present invention.

Computer programs implementing the method of this invention can commonly be distributed to users on a distribution medium such as, but not limited to, a floppy disk, a CD-ROM, a flash memory device and a portable hard drive. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The method of the present embodiments can be embodied in many forms. For example, it can be embodied in on a tangible medium such as a computer for performing the method steps. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The image is in the form of imagery data arranged gridwise in a plurality of picture-elements (e.g., pixels, group of pixels, etc.).

The term "pixel" is sometimes abbreviated herein to indicate a picture-element. However, this is not intended to limit the meaning of the term "picture-element" which refers to a unit of the composition of an image.

References to an "image" herein are, inter alia, references to values at picture-elements treated collectively as an array. Thus, the term "image" as used herein also encompasses a mathematical object which does not necessarily correspond to a physical object. The original and processed images certainly do correspond to physical objects which are the scene from which the imaging data are acquired. The scene preferably includes one or more faces of individuals. In any event, the scene includes the eyes of the individuals.

In various exemplary embodiments of the invention the method of the present embodiments analyzes a stream of imaging data. The stream can be in the form of a series of images or a series of batches of images captured at a rate which is selected so as to provide sufficient information to allow spatial as well as time-dependent analysis. For example, the images can be acquired by a video camera. A single image in a stream of images such as a video stream is referred to as a frame.

The picture-elements of the images are associated with intensity values preferably, but not necessarily, at different colors.

Ideally, the input to the method is the amount of light as a function of the wavelength of the light at each point of a scene. This ideal input is rarely attainable in practical systems. Therefore, the scope of the present embodiments includes the processing of a sampled version of the scene. Specifically, the input to the method of the present embodiments is digital signals resolvable to discrete intensity values at each pixel over the grid. Thus, the grid samples the scene, and the discrete intensity values sample the amount of light. The update rate of the images in the stream provides an additional sampling in the time domain.

Each pixel in the image can be associated with a single intensity value, in which case the image is a grayscale image. Alternatively and preferably, each pixel is associated with three or more intensity values sampling the amount of light at three or more different color channels (e.g., red, green and blue) in which case the image is a color image. Also contemplated are images in which each pixel is associated with a mantissa for each color channels and a common exponent (e.g., the so-called RGBE format). Such images are known as "high dynamic range" images.

The method of the present embodiments corrects a gaze offset in an image using previously-recorded imagery data which correspond to other image or images. Herein, the image in which the gaze offset is to be corrected is referred to as the "image 100," and the image corresponding to the previously-recorded imagery data is referred to as "image 50." Oftentimes, for clarity of presentation, the terms "currently processed image" or "original image" will be used instead of "image 100," and "replacement image" will be used instead of "image 50."

Referring now to FIG. 1, the method begins at 10 and continues to 11 at which image 100 is processed to extract locations of one or more of the eyes over image 100. The locations of the eyes can be extracted using any known image processing technique for automatic extraction of features from an image. A preferred technique for extracting the locations of the eyes according to some embodiments of the present invention is described hereinunder with reference to FIG. 6.

The method proceeds to 12 at which image 100 is processed to replace imagery data associated with each location of each eye with replacement data. The replacement data includes previously-recorded imagery data respectively corresponding to the same eye of the same individual but at a different gaze. In various exemplary embodiments of the invention the gaze characterizing the replacement data is a forward gaze, while the gaze characterizing the replaced data is offset with respect to the forward gaze.

The situation is illustrated in FIGS. 2A-D. FIG. 2A illustrates a front view of an eye 20 at a particular gaze. In the schematic illustration of the FIG. 2A the gaze is directed downward. The gaze direction is defined as the optical axis of the eye, namely a straight line connecting the retina's macula and the optical center of the cornea. The gaze direction is better shown in FIG. 2C which illustrates a side view of eye 20. As shown, gaze direction 22 is directed downward at an angle α, relative to the horizontal direction. FIGS. 2B and 2D illustrate a front view (FIG. 2B) and a side view (FIG. 2D) of the same eye 20 at a gaze direction 24, which is different from gaze direction 22. In the illustrations of FIGS. 2B and 2D the gaze is directed forwardly along the horizontal direction. Thus, FIG. 2A (or FIG. 2C) represents the imagery data of the original image (image 100) and FIG. 2B (or FIG. 2D) represents the respective replacement data. The image corresponding to the replacement data is designated 50 in FIGS. 2B and 2D.

Typically, image 100 includes a front view of the eyes, but the use of the method of the present embodiments for non-frontal views (e.g., side view images) is not excluded from the scope of the present invention. It is to be understood that although FIGS. 2A-D illustrate a situation in which a downward gaze is replaced with a forward gaze, this need not necessarily be the case, since the original image may includes a gaze directed to another direction (e.g., upward or to the sides). Furthermore, for some application it may be desired to have replacement data that correspond to a non-forward gaze. In various exemplary embodiments of the invention the gaze in the replacement data is substantially collinear with the optical axis of the imaging device that captures the eyes.

Typically, the replacement data are stored on a computer readable medium as a computer-accessible specific database of imagery data, and the method accesses the database for obtaining the replacement data. The database is "specific" in the sense that it includes images (or imagery data representing images) of the eyes of the same individual(s) that appear in the currently processed image (image 100).

The data in the specific database is preferably in a digital form. Optionally and preferably, the specific database includes data pertaining to several images of each eye, and the method searches the specific database for replacement data that best matches the eyes in image 100. Once the respective imagery data in image 100 is replaced with the replacement data, a corrected image is formed.

The term "corrected image" refers to an image in which the gaze of at least one eye in the image differs from the gaze of the same eye at the time of image capture.

The replacement of the data may optionally include one or more of the following operations: artificial enlargement of the eyes (e.g., by a factor of 5-15%), adjustment of image illumination and application of a processes known as "feathering" particularly to the border of the replacement image. A preferred procedure for replacing the data in the original image with the replacement data is provided in the Examples section that follows. Optionally, two or more corrected images, each characterized by a different gaze direction, are formed. This embodiment is particularly useful, for example, for multilateral videoconferencing as further detailed hereinafter.

The method continues to 14 at which the corrected image is transmitted to a display device. The transmission is typically over a communication network to a remote location in which a remote display device receives the corrected image and displays it. When more than one corrected image is formed, each corrected image can be transmitted to a different display device.

The method ends at 15.

Before providing a further detailed description of the system and method for correcting gaze offset, as delineated hereinabove and in accordance with the present embodiments, attention will be given to the advantages and potential applications offered thereby.

The system and method of the present embodiments are particularly useful in videoconferencing wherein the gaze of a given participant in the videoconference is corrected according to some embodiments of the present invention so as to provide the other participants with a natural view of the given participant. The system and method can be used in bilateral as well as multilateral videoconferencing.

For bilateral videoconferencing, the system and method preferably correct the gaze of the local participant such that the remote participant receives a view of the local participant as if he or she were looking into the camera, namely by correcting the gaze to a direction that is collinear with the optical axis of the camera.

For multilateral videoconferencing, the system and method preferably provides more than one gaze corrected images of the local participant. The situation is better explained with reference to FIGS. 2E-G. Consider a videoconferencing with three participants P1, P2 and P3. In FIG. 2E, participant P1 is local (seen from the back) and participants P2 and P2 are situated at remote locations. Images of P1 and P2 are transmitted to one or more display devices which are viewed by P1. FIG. 2E is similar to FIG. 2E except that P2 is local (seen from the back) and is viewing images of P2 and P3 which are situated at remote locations. FIG. 2F is also similar to FIG. 2E except that P3 is local and is viewing images of remote participants P1 and P2.

Referring to FIG. 2E, suppose that P1 is looking at P2 along gaze direction 22. In this case, the system and method according to some embodiments of the present invention generate two gaze corrected images of P1. In the first corrected image, P1 is seen as if he or she were looking into the camera. This corrected image is transmitted to P2's location, as illustrated in FIG. 2F where the first corrected gaze of P1 is indicated by arrow 24a. In the second corrected image, P1 is seen as if he or she were looking leftward. This corrected image is transmitted to P3, as illustrated in FIG. 2G, where the second corrected gaze of P1 is indicated by arrow 24b. As shown in FIG. 2G, P1 is seen to P3 as if he or she were looking in the direction of P2, thus creating an illusion of a face to face meeting.

The method and system of the present embodiments can also produces images of a virtual conference room and transmit them to the display devices of the participants. The virtual conference room can include images of participants and optionally also three-dimensional models of computer graphics representing, for example, a table and the inside of the conference room. Preferably, when each participant is arranged at its respective position in the virtual conference room, each participant sees the virtual conference room from a location at which the participant is arranged. Accordingly, the image of the virtual conference room which is viewed by each participant on its display is different among the different conference displays.

The method and system of the present embodiments can be used for correcting images of one of the participants, e.g., locally via a data processor which can be located anywhere but is typically located at the respective participant's location, or they can be employed for correcting images of more than one participant, preferably all the participants via a central data processor.

When the method and system are employed for correcting images of more than one of the participants, non-corrected images as well as specific databases can be transmitted to a central location to allow the method and/or system generating the corrected images of two or more (e.g., all) participants at the central location, and distribute them among the conference display devices. The central location can be a location which is remote with respect to all participants, or it can be the location of one of the participants (and remote with respect to all other participants).

FIG. 3 illustrates the method in an optional embodiment of the invention in which the method also captures the replacement data. In this embodiment, the method begins at 10 and continues to 31 at which one or more images of each of the individuals are captured at a one or more predetermined gazes, for example, a forward gaze, a sideward gaze and a gaze having a gaze direction which is substantially collinear with the optical axis of the imaging device that captures the eyes. The images of the eyes captured at 31 are used as replacement data.

The method optionally and preferably proceeds to 32 at which the captured replacement data is stored in a computer readable medium so as to form a computer-accessible specific database. A preferred procedure for constructing a computer-accessible specific database according to some embodiments of the present invention is provided hereinunder with reference to FIG. 7. At 33 the method receives image 100. From 33 the method continues 11, 12, 14 and 15 as further detailed hereinabove.

FIG. 4 illustrates the method in embodiments of the invention in which one or more additional optional operations are employed.

The method begins at 10 and optionally and preferably continues to 31 at which one or more images of each of the individuals are captured at one or more predetermined gazes to form replacement data, and 32 at which the replacement data is stored to form a specific database as further detailed hereinabove. Optionally, the imagery data recorded at 31 is processed so as to compute eye parameters characterizing the eyes represented by the data. The eye parameters are preferably also stored in the specific database such as to form an annotated specific database, wherein each image in the database is annotated by a respective set of parameters.

The eye parameters can be computed according to a predetermined eye model. Representative examples of eye parameters suitable for the present embodiments include, but are not limited to, the location of the center of the eye relative to one of the corners of the eye, the location of a corner of the eye relative to another corner of the eye, orientation of the eye, width of the eye, height of the eye above a line connecting the corners of the eye, height of the eye below the line connecting the corners of the eye, parameters defining one or more curved sections (e.g., parabola, hyperbola, ellipsis) conjointly modeling the boundary of the eye, the radius of the iris, etc.

A representative non-limiting example of an eye model suitable for the present embodiments is illustrated in FIG. 5. A rectangle system of coordinate is defined over an image 50 which includes eye 20, such that the axes x and y of the system are parallel to the image gridlines (not shown) and the origin O(0, 0) is defined at one of the corners of the eye (the leftmost corner in the present example). The antipodal corner (the rightmost corner in the present example) is marked A, and the straight line segment connecting the two corners is referred to hereinbelow as the OA line segment. The eye model defines the shape of the imaged eye in terms of six parameters: the center $(X_C, Y_C)$ of the eye (middle point of OA), the width w of the eye (length of OA), a first height $h_1$ measured perpendicularly to and above OA, a second height $h_2$ measured perpendicularly to and below OA, and an angle θ describing the orientation of OA (measured anticlockwise relative to the x direction in the present example).

Also contemplated is the use of one or more of the eye model parameters described in the literature [see, for example, Yuille et al. "Feature extraction from faces using deformable templates," International Journal of Computer Vision, 8:2, 99-111 (1992), and Tian et al., "Dual-state parametric eye tracking," in Automatic Face and Gesture Recognition, pages 110-115(2000), the contents of which are hereby incorporated by reference].

The characterization of the replacement data using the eye model parameters can serve for comparing the respective data in the currently processed image (image 100) with the replacement data (e.g., the eyes in the specific database).

At 33 the method receives image 100 for processing and at 11 the method extracts the locations of the eyes over image 100 as described above and further detailed hereinunder with reference to FIG. 6. The method optionally continues to decision 42 at which the method determines whether or not the eyelid 26 of eye 20 is close or open. In other words, at 42 the method attempts to determine whether or not the individual(s) in image 100 is in a blink state. The determination can be based on the results of extraction 11. For example, the method can determine that the eyelid is close when the method fails to identify the eye in image 100 (i.e., when the extraction of eye's location fails) and that the eyelid is open when the eye is identified (i.e., when the extraction of eye's location is successful).

If the eyelid is close, the method loops back to 33, waits to receive another image for processing (e.g., the successive frame of the video stream) and continues thereafter to 11. If the eyelid is open, the method optionally continues to decision 44 at which the method determines a characteristic gaze direction of the eye and decides, based on the characteristic gaze, whether or not there is a gaze offset. A gaze offset is defined as a gaze having a direction other than a predetermined gaze direction. Preferably the predetermined gaze direction is collinear with the optical axis of the imaging device that captured image 100.

If the method identifies that the gaze is generally at the predetermined gaze direction (i.e., there is no gaze offset) the method loops back to 33, waits to receive another image for processing (e.g., the successive frame of the video stream) and continues thereafter to 11. If the method determines that the gaze direction substantially deviates from the predetermined gaze direction (for example, deviation of more than 5°) a gaze offset is identified and the method optionally continues to 45.

The gaze direction can be determined by any technique known in the art. In some embodiments of the present invention, a machine-learning procedure is used. The machine-learning procedure can be trained, preferably prior to the execution of the method, on a collection of training images each being annotated with a gaze direction, to provide a trained gaze direction classifier. Once trained, the gaze direction classifier can be applied to the previously-recorded data (image 50) to thereby extract the gaze direction characterizing image 50. Since image 50 corresponds to the desired gaze direction, the gaze direction as obtained by the classifier from image 50 can be used as the predetermined gaze direction for the purpose of decision 44.

In embodiments in which a specific database is employed, the classifier is preferably applied to all images in the specific database to obtain a range of gaze directions characterizing the database. In operation, the classifier is applied to image 100 (or some region-of-interest thereof) to obtain the gaze direction of image 100. If the gaze direction of image 100 is not within the ranged characterizing the specific database, the method determines that there is a gaze offset. Otherwise, the method determines that there is no gaze offset.

At 45 the eye parameters of image 100 are computed. In embodiments in which the replacement data (image 50) is processed to compute eye parameters, the computations of parameters for the currently processed image (image 100) are preferably according to the same eye model that is used for computing the parameters for image 50. For example, when a six-parameter eye model (e.g., the model illustrated in FIG. 5) is used for characterizing image 50, the same six-parameter eye model is used for characterizing the eyes in image 100.

The parameters as computed at 45 can also be used for determining whether or not the eyelid is open. In these embodiments, 45 is executed before decision 42 and the decision at 42 is by imposing a predetermined set of criteria to the computed parameters. For example, when the parameters includes one or more height parameters measured perpendicularly to the straight line connecting the corners of the eyes (e.g., the aforementioned heights $h_1$ and $h_2$) the method can determine that the eyelid is close when the value of each of the height parameters is below a predetermined threshold or when the sum of two or more height parameters is below a predetermined threshold. A suitable threshold for this embodiment of the invention is about 5 pixels or about 4 pixels or about 3 pixels or about 2 pixels. In some embodiments of the present invention the method determines that the eyelid is close when both $h_1$ and $h_2$ are less than 2 pixels.

The method optionally continues to 46 at which the computer-accessible specific database is searched for replacement data that matches the eyes in image 100. Typically, such search includes comparison between the imagery data of image 100 with imagery data entries in the database and determination of a similarity level responsively to the comparison. The replacement data can then be selected based on the calculated similarity level. Typically, the data with highest similarity level is selected.

Any type of similarity measure can be employed for calculating the similarity level during the comparison. In some embodiments of the present invention normalized cross correlation is used.

The comparison can also be done in terms of the computed eye model parameters, wherein the eye model parameters as computed for image 100 are compared with the eye parameters as computed for image 50. In these embodiments, the search over the specific database is performed in a multidimensional space spanned by the eye-model parameters. For example, when an n-parameter eye model is employed, the search is conducted in an n-dimensional space.

The method optionally continues to 47 at which a morphological transformation is applied to the replacement data according to the eye model parameters. This transformation is preferably executed so as to rescale image 50 to fit the eye in image 100. The transformation can include any of: translation, rotation, stretching and shrinking. For example, when the six-parameter eye model of FIG. 5 is used (both for image 50 and image 100), the center can be shifted by the differences in the respective $X_C$ and $Y_C$ values, the width w can be scaled by the ratio of the respective w values, the regions above and below the OA line segment can be stretched or shrunk in accordance with the respective $h_1$ and $h_2$ values, and the entire replacement eye image can be rotated by the difference in the respective θ values. The transformation can also be part of the search over the database. Specifically, the transformation can be applied to each candidate eye in the database and the comparison can be made between the morphologically transformed candidate eye and the eye of the currently processed image.

When image 100 is a frame of a video stream, the search for best matching eyes in the database can also be based on the results of previous searches. For example, the replacement data of the previous frame can be used as the initial guess for a candidate in the current frame. This initial guess can be refined, preferably by conducting a further search in the database, so as to obtain a better match. The search can include a combined optimization procedure which comprises a first objective function for reducing differences between the replacement data and replacement data of the previous frame and a second objective function for reducing differences between the replacement data and replacement data of a frame immediately following an eyelid opening. The present inventors discovered that such combined optimization procedure reduces drift over time and accumulation of tracking errors. This embodiment is particularly useful for preventing the eye to gradually shrink. For the first and second objective functions, any statistical moment can be used, such as, but not limited to, sum of squared differences.

The method optionally continues to 48 at which the parameters of the eye in image 50 (the replacement data) are varied so as to optimize a predetermined objective function (e.g., normalized cross correlation) describing matching between the eye in image 100 and the eye in image 50. The method continues to 49 at which, imagery data associated with each location of each eye is replaced with the matched, and optionally varied, replacement data, to provide a corrected image.

Optionally, more than one corrected image is formed, where each corrected image is characterized by a different gaze. The gaze of each corrected image can be selected responsively to the gaze as determined (e.g., using the trained classifier) for the original image. For example, when the method is employed for multilateral videoconferencing, the gaze of the original image can be analyzed to determine to which of the participants on the local display eyes 20 are directed. Then, for each of the displayed participants, a corrected image with a different gaze is formed, e.g., a corrected image with a forward gaze for the looked-at participant, and a corrected image with a sideward gaze to the other participants, as explained hereinabove and exemplified in FIGS. 2E-G.

The method continues to 14 at which the corrected image or images is transmitted to a display device or display devices, as further detailed hereinabove.

The method ends at 15.

Reference is now made to FIG. 6 which is a flowchart diagram illustrating a procedure suitable for extracting the locations of an eye an image, according to some embodiments of the present invention. The procedure is particularly useful for extracting the locations of the eyes in image 100 or image 50. Thus, the procedure can be used for executing operation 11 of the embodiments described with reference to FIGS. 1, 3 and 4.

The procedure begins at 60 and continues to 61 at which the corners of the eye (see points O and A in FIG. 5) are detected. This can be done using any image processing technique known in the art. In some embodiments of the present invention the procedure employs the technique disclosed in Everingham et al., "'Hello! My name is . . . Buffy'—automatic naming of characters in TV video," In BMVC, 2006, the contents of which are hereby incorporated by reference, or some variant thereof.

The procedure continues to 62 at which a region-of-interest is defined using the two detected corners. In various exemplary embodiments of the invention a rectangular region-of-interest is defined. For example, the region-of-interest can be a rectangle whose width approximately equals or slightly above the distance w between the two corners (see FIG. 5) and height is less than the w. In experiments performed by the present inventors a rectangular region-of-interest having dimensions of 1.2 w×0.6 w was used. The region-of-interest was defined such that the OA line segment (see FIG. 5) passed through the center of the rectangle parallel to its longest dimension. Other shapes, dimensions, and relative locations of the region-of-interest are not excluded from the scope of the present invention.

The procedure continues to 63 at which the region-of-interest is scaled to predetermined dimensions. In the experiments performed by the present inventors, the rectangular region-of-interest was scaled to an image of 120×80 pixels. Other scaling schemes are not excluded from the scope of the present invention.

The procedure ends at 64.

Reference is now made to FIG. 7 which is a flowchart diagram illustrating a procedure suitable for constructing a specific database, according to some embodiments of the present invention. The procedure can be used for executing operations 31 and 32 of the embodiments described with reference to FIGS. 3 and 4.

The procedure begins at 70 and continues to 71 at which a set of images are captured for at least one individual at one or more predetermined gazes. The gaze(s) can be a forward gaze, a sideward gaze, a gaze having a gaze direction which is substantially collinear with the optical axis of the imaging device that captures individual(s) etc. The following operations are preferably performed for each image in the set.

The procedure continues to 72 at which the location of each eye is extracted from the respective image of the set. This is preferably executed by means of the procedure described above with reference to FIG. 6. Thus, eye corners are detected and region-of-interests are defined and scaled as further detailed hereinabove.

The procedure then continues to 73 at which the respective image is processed so as to extract image features pertaining to the eyes in the image. The image features can be extracted in more than one. For example, in some embodiments, a Scale-Invariant Feature Transform (SIFT) representation is employed. This representation is known in the art and is found, e.g., in U.S. Pat. No. 6,711,293, the contents of which are hereby incorporated by reference.

While the embodiments below are described with a particular emphasis to the SIFT representation, it is to be understood that more detailed reference to SIFT is not to be interpreted as limiting the scope of the invention in any way, and that other representations, including, without limitation, gray values in the region-of-interest, are not excluded. Also contemplated are combinations of representations for better accuracy.

The SIFT descriptors can be computed over a dense grid for the scaled region-of-interest. In experiments performed by the present inventors, a 6×4 grid was employed, but other grid densities are not excluded from the scope of the present invention. Once all the SIFT descriptors are computed, they are preferably concatenated into a vector.

At 74 the extracted features (e.g., the vector of SIFT descriptors) are fed to a machine learning algorithm for computing approximated eye parameters according to a predetermined eye model, such as the aforementioned six-parameter model or any eye model known in the art. In various exemplary embodiments of the invention the computation of approximated eye parameters is bootstrapped by means of an annotated non-specific database of imagery data. The database is "non-specific" in the sense that it includes images (or imagery data representing images) of eyes of several individuals which are not necessarily the individual(s) which are imaged at 71. Preferably, the non-specific database includes images (or imagery data representing images) of eyes of at least one or at least two or at least three or at least four or at least five individuals other than the individuals that appear in the set of images. The non-specific database is "annotated" in the sense that each image in the non-specific database is associated with a set of eye-parameters that define, preferably uniquely, the eye in that image. In experiments performed by the present inventors, a non-specific annotated database of approximately 200 images of 14 different individuals was used, but other sizes of non-specific database are not excluded from the scope of the present invention.

Let i be some image captured at 71. The machine learning algorithm accesses the annotated non-specific database and compares the features (as extracted at 73) of image i to features in the images of the non-specific database. Based on this comparison, the machine learning algorithm computes the approximated eye parameters of image i. In various exemplary embodiments of the invention the procedure selects from the non-specific database an image j which best matches image i.

Any type of machine learning algorithm can be used. Preferably, the machine learning algorithm features supervised learning. Representative examples of machine learning algorithm suitable for the present embodiments include, without limitation, support vector machine (SVM) regression, nearest neighbor classifier and the like. These types of machine learning algorithms are known in the art and are found, e.g., in U.S. Pat. Nos. 6,892,193 and 6,134,344 and U.S. Published Application No. 20080187213, the contents of which are hereby incorporated by reference.

The procedure then continues to 76 at which the parameters are varied so as to optimize a predetermined objective function (e.g., normalized cross correlation) describing matching between the respective image of the set (captured at 71) and the images in the non-specific database. In various exemplary embodiments of the invention the objective function describes matching between image i of the set and image j of the non-specific database. This operation is preferably preceded by a morphological transformation 75 selected so as to rescale image j to fit image i. The morphological transformation is preferably applied according to the eye model parameters, as further detailed hereinabove.

The procedure ends at 77.

Reference is now made to FIG. 8 which is a schematic illustration of an imaging system 80, according to various exemplary embodiments of the present invention. System 80 comprises a camera 82 for capturing an image of at least one individual 84 having eyes 20, and a processor 86 configured for processing the image so as to extract locations of the eyes over the image and replace imagery data associated with each location of each eye with replacement data as further detailed hereinabove. Processor 86 can also be configured for transmitting the corrected image to a remote display device (not shown). System 80 can also include a local display device or monitor 90 for presenting individual 84 with a view of an image of another individual (not shown) at a remote location. In one application of system 80, camera 82 captures an image or a stream of images of individual 84 while he or she is looking into monitor 90. Since individual 84 is looking into monitor 90 and not camera 82, there is a gaze offset in the captured image or images. Processor 86 corrects the gaze offset and transmits the corrected image(s) to one or more remote display devices. In the corrected image(s), individual 84 is seen as if he or she were looking into camera 82 (e.g., at a forward gaze), or as if he or she were looking at another participant. In some embodiments of the present invention, system 80 constructs a computer-accessible specific database of replacement imagery data. In these embodiments, camera 82 captures a set of images and processor 86 processes these images for constructing the specific database, as further detailed hereinabove.

Processor 86 can be supplemented by a computer software product, which comprises a computer-readable medium 88 in which program instructions are stored. The instructions, when read by processer 86, cause the processer to process the image and transmit the corrected image to a display device. The program instructions can also cause processer 86 to construct the specific database, as further detailed hereinabove.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Prototype System for Videoconferencing

A prototype system for correcting gaze offset was constructed according to some embodiments of the present invention. In experiments performed using the system, the system successfully replaced the eyes of a person in a video stream with eyes that look straight ahead. Eyes were captured at an initial training stage. During the videoconferencing session, the system found and tracked the eyes. In every frame, the eyes captured during training were accurately pasted to create an illusion of straight-looking gaze.

FIGS. 9A-D shows four images of two individuals captured during the experiments. FIGS. 9A and 9D are control images in which the respective individual was captured at a forward gaze, and FIGS. 9B and 9C are images which were corrected by the prototype system and in accordance with preferred embodiments of the present invention. Surprisingly, the resulting effect of replacing the eyes alone looked natural.

The prototype system included an eye detector for receiving an image of a face and returning an accurate position of the eye. Once eye location was detected, it was replaced with an image of the same eye but with a proper gaze direction. To achieve this goal the system learned a regression function that mapped face images to eye model parameters, using a non-specific database of annotated images. This stage was followed with a refinement stage.

The experiments included three stages, as follows. In a first stage, referred to as "offline training", a rough eye pose estimation was learned from the annotated non-specific database. This database was a general database, unrelated to the any particular videoconferencing session. A second stage was executed at the beginning of the video conferencing session where the users were requested to look straight at the camera. This allowed the system to construct a specific database of direct gaze images. In a third stage the system detected the location of the eye in the current frame, found the most similar image in the specific database and replaced it. The eye model that was used in the experiments included six parameters, as depicted in FIG. 5 above.

In the offline training stage, the direct gaze models were learned based on previous annotated examples. These examples were stored in a non-specific database that was used to bootstrap the runtime system. It consisted of a separate set of 14 individuals for whom videos were captured and manually annotated in accordance with the six-parameter model.

In the second stage, the specific database was constructed. Given images of a new person looking directly into the camera, the closest eye in the non-specific database was retrieved and then served as an initial guess as to the eye parameters in the new image. These parameters were then adapted to provide a more accurate estimation.

In the third stage, the parameters of the eyes in the video were estimated by matching the image to the eyes of the person when looking straight. The illumination was corrected, and a replacement was performed.

Following is a more detailed description of the experiments.

Training

Given a video of a person looking directly into the camera, the eye parameters were found by the system. This was done for each frame independently, thereby collecting pairs of straight looking eyes of that person. The localization of the corners of the eyes was achieved using the method of Everingham et al., supra, which describes the geometric distribution of facial features as a tree-structured mixture of Gaussians [P. F. Felzenszwalb and D. P. Huttenlocher, "Pictorial structures for object recognition," IJCV, 2005] and captures appearance by Haar-wavelet like features [P. Viola and M. Jones, "Robust real-time face detection," In CVPR, volume 2, page 747, 2001].

Once the corners of the eyes were localized, a rectangular region-of-interest which approximately captures the eye regions was constructed for each eye. Let w be the distance between the two corners of the eye (see FIG. 5). The rectangle of each eye was a combination of a strip of width $h_1=0.3$ w above the line segment OA (see FIG. 5) and of a strip of width $h_2=0.3$ w below this line. Each region-of-interest was scaled to an image of 120×80 pixels. Then, SIFT descriptors were computed at 24 evenly spaced points in the stretched image.

Figure 10A:
Figure 10B:
Figure 10C:
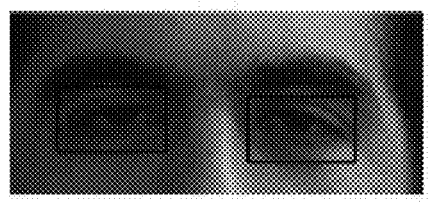
Figure 10D:
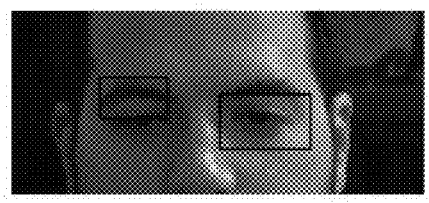

FIGS. 10A-C show samples of successful facial feature points detection obtained by eye corner localization. The region-of-interest around the eyes is marked by a black rectangle. FIG. 10D shows an example of a failure case in detection. For such cases, the last model of an open eye was used to initialize the eye model search process.

From the non-specific database of manually annotated eyes, the left and right eyes with the closest appearance descriptor were selected. This yielded an approximate model. In Leave-One-Person-Out experiments conducted on the non-specific database it was found that their average absolute error is about 3 pixels for the center of the eye, and about 6 pixels in the width of the eye.

Tables 1 and 2 below present the regression results for the left and right eyes, respectively. The values in Tables 1 and 2 correspond to mean±standard deviation. Two representations are compared in the tables: the SIFT representation and the vector of gray values in the eye rectangle resized to 120 pixels times 80 pixels. Also compared are two machine learning algorithms: SVM Regression and Nearest Neighbor. As shown, SIFT obtained preferable performance, especially for the Nearest Neighbor classifier.

TABLE 1

| parameter | gray values | | SIFT | |
|---|---|---|---|---|
| | NN | SVM | NN | SVM |
| $X_C$ | 4.26 ± 3.62 | 3.08 ± 2.3 | 3.02 ± 2.47 | 3.08 ± 2.3 |
| $Y_C$ | 4.3 ± 2.96 | 3.84 ± 2.92 | 2.73 ± 1.8 | 3.23 ± 2.72 |
| w | 7.83 ± 6.16 | 6.86 ± 6.51 | 6.95 ± 6.52 | 6.47 ± 6.79 |
| $h_1$ | 3.79 ± 2.25 | 3.35 ± 2.28 | 3.58 ± 3.04 | 3.35 ± 2.28 |
| $h_2$ | 3.22 ± 2.73 | 2.93 ± 2.51 | 2.45 ± 1.72 | 2.68 ± 2.56 |
| θ | 0.10 ± 0.06 | 0.08 ± 0.04 | 0.08 ± 0.06 | 0.07 ± 0.05 |

TABLE 2

| parameter | gray values | | SIFT | |
| --- | --- | --- | --- | --- |
| | NN | SVM | NN | SVM |
| $X_C$ | 3.69 ± 2.99 | 7.49 ± 4.66 | 3.76 ± 3.06 | 5.72 ± 4.42 |
| $Y_C$ | 3.62 ± 2.89 | 3.01 ± 2.62 | 2.84 ± 2.01 | 2.91 ± 2.54 |
| w | 8.03 ± 6.26 | 6.13 ± 4.7 | 5.24 ± 4.48 | 5.81 ± 4.89 |
| $h_1$ | 3.28 ± 2.77 | 2.94 ± 2.4 | 2.35 ± 1.89 | 2.89 ± 2.37 |
| $h_2$ | 2.4 ± 1.88 | 2.05 ± 1.71 | 2.28 ± 2.04 | 2.05 ± 1.71 |
| θ | 0.07 ± 0.05 | 0.06 ± 0.05 | 0.076 ± 0.05 | 0.06 ± 0.05 |

This initial model was then refined by performing a local search in the space of the 6 parameters. The search was conducted in a range of twice the average error in each parameter, and in a coarse to fine manner.

For each set of candidate parameter values, the closest eye in the non-specific database was translated, rotated and stretched in accordance with the difference in parameters. The center was shifted by the different in $X_C$ and $Y_C$, the width was scaled by the ratio of the w values, the regions above and below the line connecting the two corners were stretched in accordance with $h_1$ and $h_2$ respectively, and the database eye image was rotated by the difference in the 0 values between the database image and the candidate parameter value.

As a matching score, the normalized cross correlation measure between the warped database eye and the eye in the new directly looking frame was used. The region-of-interest for this comparison was the region of the eye, slightly enlarged, and not a rectangular frame.

A threshold was used to determine cases in which the search for eye parameters failed to produce good database to image matches. Typically, the process successfully produced one pair of eyes for 80% of the frames in the training video.

Table 3 below summarizes the mean (±standard deviation) error in pixels for each parameter of the eye model after the refinement stage. The errors were estimated in a leave-one-out fashion on the non-specific database.

TABLE 3

| Parameter | Left eye | Right eye |
| --- | --- | --- |
| $X_C$ | 2.04 ± 1.80 | 1.75 ± 1.52 |
| $Y_C$ | 1.86 ± 1.72 | 1.60 ± 2.02 |
| w | 6.66 ± 5.03 | 4.29 ± 3.70 |
| $h_1$ | 3.68 ± 3.42 | 2.54 ± 1.93 |
| $h_2$ | 2.22 ± 1.95 | 2.20 ± 1.83 |
| θ | 0.08 ± 0.06 | 0.06 ± 0.04 |

Runtime

During runtime, the system replaced frames whenever the eyelid was open. During blinks, no replacement was done. Immediately after a blink, the system is reinitialized and started similarly to the first frame in the video steam. Remarkably, the lack of intervention during blink frames did not seem to reduce the quality of the resulting video.

In the first frame (or first frame after a blink), the best matching set of eyes were searched for. This was done by using the normalized correlation measurements to compare the learned eye models to an eye shaped region-of-interest situated between the corners of the eyes and at a width of 0.7 w. Notice that SIFT descriptors were not used at runtime, since the goal was to find eyes that were similar in appearance, so as to prevent or at least reduce artifacts during replacement.

Once the closest direct looking pair of eyes was found, they where morphed in order to better fit the new frame. This was done by searching in the six dimensional parameter space, similarly to the search performed during training. The search performed during runtime for all frames other than the first frame after a blink included calculation of sum of squared differences (SSD). Note that this is unlike the training phase and the first frame after a blink where the normalized cross correlation matching score was used.

Figure 11A:
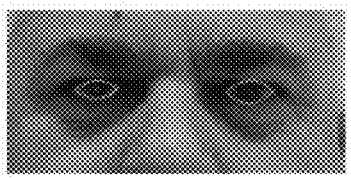
Figure 11B:
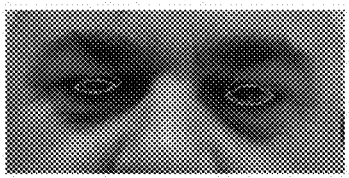
Figure 11C:
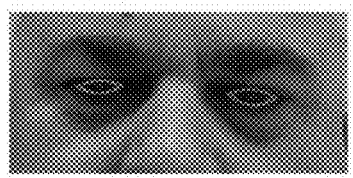
Figure 11D:
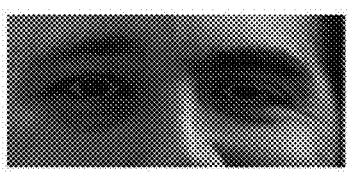
Figure 11E:
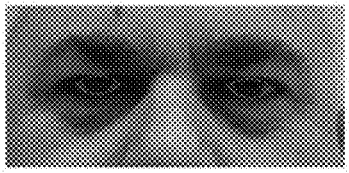
Figure 11F:
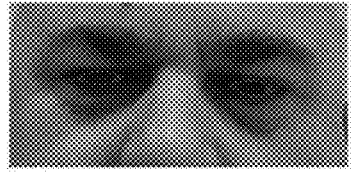

FIGS. 11A-F show initially fitted model (red) and refined model obtained by the search procedure (green). During the specific database construction, the initial guess was the nearest neighbor (for each eye separately) in the SIFT feature space from among the training examples of the non-specific database (FIG. 11A). In the first frame of the videoconferencing session, the initial guess for each eye was the highest correlated example in the specific database (FIG. 11B). In the tracking phase, the initial guess was the eye-model of the previous frame (FIG. 11C). FIG. 1D depicts the two eyes (from two different individuals) from the non-specific database that were used as an initial guess for the eye model of FIG. 11A. The initial models for FIG. 11B were taken from FIG. 11E which shows an entry of the specific database. The initial model for FIG. 11C was taken from the previous video frame shown in FIG. 11F.

The eye parameters were estimated for every frame in the video stream. Given a new frame, the eye parameters of the previous frame serve as an initial guess, and a search was once again conducted as a refinement process. The matching score was composed of two components. One component considered the sum of squared differences (SSD) between the eye in the current frame and the eye in the previous frame, where the latter was warped to the new frame in accordance with the difference in the eye parameters. Another component considered the SSD between the current eye and the warped eye from the first frame.

SSD was used since illumination changes between consecutive frames were expected to be small and since it was convenient to combine multiple SSD scores. The combined cost term minimized drift over time, and reduced accumulation of small tracking errors. A noticeable example would be for the eye to gradually shrink, as shown in FIGS. 12A-D. FIGS. 12A and 12C show result of eye replacement after tracking the eye model while only considering the previous frame, and FIGS. 12B and 12D show result of eye replacement after tracking the eye model while considering both the previous frame and the first frame. As shown, the eye tends to shrinks without the first frame consideration.

In cases in which the search process performed during tracking failed, a blink was declared, and the system entered a blink mode. While in this mode, the eye parameters were not adapted, and no eye replacement took place. During every blink frame, tracking based on the last detected eye model was attempted. Once this tracking was successful for both eyes for at least 2 consecutive frames, the blink state was terminated.

The first frame after the blink mode was treated as if it was the first frame of the video sequence. This allowed the system to move to a more suitable set of eyes. In cases in which the eye corner detector failed, the last model of an open eye was used to initialize the eye model search process. Although the pair of replacement eyes used between two successive blinks did not change, this effect was unnoticeable.

The eye replacement was done by pasting the warped set of model eyes onto the eye location in the image. The warping was done in order to adjust the parameters of the model eyes to the parameters of the actual eyes in the video frame. In order to eliminate artifacts, several optional operations were taken.

In one such optional operation, the eyes were enlarged by a factor of 10% in the vertical direction. This compensated for underestimation of the height of the eye due to the change in gaze between the model eyes and the actual eyes. In addition, this operation ensured that there were no residue pixels from the original eye.

Another such optional operation was adjustment of image illumination. To this end, a low pass quotient image was applied [T. Riklin-Raviv and A. Shashua, "The quotient image: Class based recognition and synthesis under varying illumination conditions," In CVPR, 1999; Liu et al., "Expressive expression mapping with ratio images," In SIGGRAPH, 2001; and Wang et al., "Face relighting from a single image under arbitrary unknown lighting conditions," PAMI, 31(11): 1968-1984, 2009; Bitouk et al., "Face swapping: automatically replacing faces in photographs," In SIGGRAPH, 2008]. For both the original pixels to be replaced and the new eye to be pasted, the illumination was estimated by fitting a third order polynomial to the image data [R. Basri and D. Jacobs, "Lambertian reflectance and linear subspaces," PAMI, 25(2): 218-233, February 2003].

Denote the Red value of pixel (x, y) in the original video frame as $I_R^{(1)}(x,y)$, and the values in the pasted eye image as $I_R^{(2)}(x,y)$. Let $\hat{I}_R^{(1)}(x, y)$ and $\hat{I}_{Rhu\,(2)}(x, y)$ be the corresponding values of the fitted low-order polynomial:

$$\hat{I}_R^{(1)}(x, y) = \sum_{i=0}^{3} \sum_{j=0}^{3-i} \beta_{R,ij}^{(1)} x^i y^j$$

$$\hat{I}_R^{(2)}(x, y) = \sum_{i=0}^{3} \sum_{j=0}^{3-i} \beta_{R,ij}^{(2)} x^i y^j$$

The fitting was done to each of the three channels R, G and B separately using a least square system of equations (10 unknown βs per image per channel).

Using quotient image re-illumination, the new image values were given by:

$$I_R^{(1)}(x, y) = I_R^{(2)}(x, y) \frac{\hat{I}_R^{(1)}(x, y)}{\hat{I}_R^{(2)}(x, y)}.$$

An additional optional operation included a feathering technique in which on a strip of about 10 pixels surrounding the replaced region, blending with linear weights was performed between the old image and the pasted eye.

FIGS. 13A-D demonstrates the eye replacement procedure and the optional operations. FIG. 13A shows the original image of the eye to be replaced. FIG. 13B shows eye replacement without the quotient image re-illumination stage. As shown, the highlight on the left eye lid of the subject is not consistent with the input image. FIG. 13C shows eye replacement with the quotient image but without feathering. As shown, the highlight was removed, but additional edges were created around the right eye. FIG. 13D shows eye replacement with both quotient image and feathering. As shown, the illumination was corrected and the spurious edges were suppressed by feathering.

Results

The system was tested on a number of sequences. All sequences were captured at 1280×1024 pixels at 25 frames per second. The non-specific database consisted of about 200 images of 14 individuals with manually annotated eye models. At the beginning of the videoconferencing session, each user was asked to look straight at the camera for a couple of seconds. These frames were used to construct the specific database that was used for the remaining of the session of each individual.

FIG. 14 shows several frames from some of the video sequences that were processed. In each image pair of FIG. 14, the left image is the original image and the right image is the modified image. The top right pair of images and the left pair of images of the fifth row show cases in which the system automatically detected a blink and did not modify the image.

The prototype system of the present embodiments also maintained a high level of temporal consistency with no flickering. In other words, the eye did not change its size from frame to frame.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of correcting gaze offset in an image of at least one individual having eyes, comprising:
   processing the image so as to extract location of at least one eye over the image;
   processing the image to replace imagery data associated with each location of each eye with replacement data, said replacement data being previously-recorded imagery data which respectively correspond to the same eye but a different gaze, wherein said replacing is based, at least in part, on eye parameters defining a shape of said eye and being computed using a non-specific database of eye images, thereby providing a corrected image; and
   transmitting said corrected image to a display device.

2. The method of claim 1, further comprising, prior to said extraction of said locations, capturing at least one image of each of the at least one individual at one or more predetermined gazes, thereby providing said previously-recorded data.

3. The method according to claim 1, further comprising processing said previously-recorded data so as to compute eye parameters wherein said replacing is based on said computed parameters.

4. The method of claim 3, wherein said computation of said parameters is bootstrapped using said non-specific database of eye images.

5. The method according to claim 3, further comprising applying a morphological transformation to said previously-recorded data according to said parameters.

6. The method according to claim 4, further comprising varying said parameters so as to optimize a predetermined objective function describing matching between said replacement data and images in said non-specific database.

7. The method according to claim 3, further comprising varying said parameters so as to optimize a predetermined objective function describing matching between said replacement data and said imagery data associated with said location of said eye.

8. The method according to claim 1, further comprising, for each eye, determining whether an eyelid of said eye is close or open, wherein said imagery data is replaced with said replacement data only if said eyelid is open.

9. The method according to claim 1, further comprising, for each eye, determining a characteristic gaze direction of said eye, wherein said imagery data is replaced with said replacement data only if said gaze direction is other than a predetermined gaze direction.

10. The method according to claim 1, further comprising, processing the image to replace imagery data associated with each location of each eye with additional replacement data to provide at least one additional corrected image such that each corrected image is characterized by a different gaze, and transmitting each corrected image to a different display device.

11. The method according to claim 10, further comprising for each eye, determining a characteristic gaze direction of said eye, wherein said at least one additional corrected image is generated responsively to said determined characteristic gaze direction.

12. A computer software product, comprising a non-transitory computer-readable medium in which program instructions are stored, which instructions, when read by a processor, cause the processer to process the image so as to extract locations of at least one eye over the image, to provide a corrected image by replacing imagery data associated with each location of each eye with replacement data being previously-recorded imagery data respectively corresponding to the same eye but a different gaze, said replacing being based, at least in part, on eye parameters defining a shape of said eye and being computed using a non-specific database of eye images, and to transmit said corrected image to a display device.

13. An imaging system, comprising:
(a) a camera for capturing an image of at least one individual having eyes; and
(b) a processor configured for:
processing the image so as to extract locations of at least one eye over the image, processing the image to replace imagery data associated with each location of each eye with replacement data being previously-recorded imagery data respectively corresponding to the same eye but a different gaze, wherein said replacing is based, at least in part, on eye parameters defining a shape of said eye and being computed using a non-specific database of eye images, thereby providing a corrected image; and
transmitting said corrected image to a display device.

14. The system of claim 13, wherein said previously-recorded imagery data are processed by the processor so as to compute eye parameters wherein said imagery data are replaced based on said computed parameters.

15. The system of claim 13, wherein said computation of said parameters is bootstrapped using an annotated non-specific database of eye images.

16. The system according to claim 14, wherein said previously-recorded data are transformed by said processor using a morphological transformation according to said parameters.

17. The system according to claim 14, wherein said parameters are varied by said processor so as to optimize a predetermined objective function describing matching between said replaced data and said replacement data.

18. The system according to claim 13, wherein the image is processed by said processor to determine whether an eyelid of said eye is close or open, and wherein said imagery data is replaced with said replacement data only if said eyelid is open.

19. The system according to claim 13, wherein the image is processed by said processor to determine a characteristic gaze direction of said eye wherein said imagery data is replaced with said replacement data only if said characteristic gaze direction is other than a predetermined gaze direction.

20. The system according to claim 13, wherein the image is processed by said processor to replace imagery data associated with each location of each eye with additional replacement data to provide at least one additional corrected image, such that each corrected image is characterized by a different gaze, and transmitting each corrected image to a different display device.

21. The system according to claim 20, wherein the image is processed by said processor to determine a characteristic gaze direction of said eye, wherein said at least one additional corrected image is generated responsively to said determined characteristic gaze direction.

22. The method according to claim 1, wherein said extraction of said locations comprises, for each eye: detecting eye corners, defining a region-of-interest based on said corners and scaling said region-of-interest to predetermined dimension.

23. The method according to claim 1, wherein said previously-recorded imagery data is stored in a computer-accessible specific database of imagery data, and wherein said replacement of said imagery data comprises searching over said specific database for said previously-recorded imagery data.

24. The method of claim 23, wherein said searching comprises comparing imagery data of the image with imagery data entries in said specific database, determining a similarity level responsively to said comparison, and selecting said previously-recorded imagery data based on said similarity level.

25. The method according to claim 1, wherein said image is a frame of a video stream.

26. The method of claim 25, wherein said replacement data are selected from a specific database according to an optimization procedure which comprises a first objective function for reducing differences between said replacement data and replacement data of a previous frame, and a second objective function for reducing differences between said replacement data and replacement data of a frame immediately following an eyelid opening of the respective eye.

* * * * *